United States Patent
Sugiyama

(10) Patent No.: US 7,174,794 B2
(45) Date of Patent: Feb. 13, 2007

(54) ROTATION SENSOR AND COUPLING FOR ROTATION SENSOR

(75) Inventor: Satoshi Sugiyama, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/844,509

(22) Filed: May 13, 2004

(65) Prior Publication Data

US 2005/0211001 A1    Sep. 29, 2005

Related U.S. Application Data

(60) Provisional application No. 60/469,822, filed on May 13, 2003.

(51) Int. Cl.
  *G01L 3/00*   (2006.01)
  *G01N 3/02*   (2006.01)

(52) U.S. Cl. ..................... 73/862.08; 73/856

(58) Field of Classification Search ............. 73/862.08, 73/856

See application file for complete search history.

(56) References Cited

U.S. PATENT DOCUMENTS

| | | | |
|---|---|---|---|
| 3,655,953 A * | 4/1972 | Gubelmann et al. | 235/137 |
| 3,745,820 A * | 7/1973 | Weiner | 73/862.25 |
| 4,093,055 A * | 6/1978 | Blackburn et al. | 192/116.5 |
| 4,751,868 A * | 6/1988 | Paynter | 92/48 |
| 4,922,761 A | 5/1990 | Onishi et al. | |
| 5,129,616 A * | 7/1992 | Carson | 248/457 |
| 5,655,621 A | 8/1997 | Birsching | |
| 6,179,759 B1 * | 1/2001 | Tellone | 482/111 |
| 6,190,264 B1 | 2/2001 | Al-Rawi | |
| 6,427,307 B1 | 8/2002 | Al-Rawi | |
| 6,694,828 B1 * | 2/2004 | Nicot | 73/862.326 |
| 6,855,015 B2 * | 2/2005 | Scott et al. | 440/2 |

FOREIGN PATENT DOCUMENTS

DE    3801 458 A1    8/1989

* cited by examiner

*Primary Examiner*—Max Noori
(74) *Attorney, Agent, or Firm*—Oblon, Spivak, McClelland, Maier & Neustadt, P.C.

(57) ABSTRACT

A coupling includes a first coupling member, a second coupling member, and a third coupling member being located in between the first coupling member and the second coupling member. The third coupling member has formed thereon a first pair of connecting elements diametrically opposed to one another and defining a first axis, and further has formed thereon a second pair of connecting elements diametrically opposed to one another and defining a second axis that is substantially perpendicular to the first axis. The first coupling member has formed thereon a third pair of connecting elements configured to conform to the first pair of connecting elements of the third coupling member. Formed on the second coupling member is a fourth pair of connecting elements configured to conform to the second pair of connecting elements of the third coupling member.

30 Claims, 13 Drawing Sheets

ROTATION SENSOR AND COUPLING FOR ROTATION SENSOR

CROSS-REFERENCE TO RELATED PATENT APPLICATIONS

The present application claims priority to U.S. provisional patent application Ser. No. 60/469,822, which contains subject matter related to that disclosed in U.S. patent application Ser. No. 10/336,991, filed Jan. 6, 2003, entitled "Rotation Sensor" and now issued as U.S. Pat. No. 6,715,368 B1; U.S. patent application Ser. No. 10/316,442, filed on Dec. 11, 2002, entitled "Rotation Sensor" and now issued as U.S. Pat. No. 6,725,734 B1; Japanese Patent Application No. 2002-299218, filed in the Japanese Patent Office on Oct. 11, 2002; and Japanese Patent Application No. 2002-14185, filed in the Japanese Patent Office on Jan. 23, 2002, the entire contents of each of which being incorporated herein by reference.

BACKGROUND OF THE INVENTION

1. Field of the Invention

The present invention relates to rotation sensors and couplings used in rotation sensors, where such rotation sensors may be used as an automotive rotation sensor for steering systems. More particularly, the present invention relates to contact-type automotive rotation sensors and couplings therefor.

2. Discussion of the Background

A general summary of the related art is provided in the two U.S. patent applications cited above, and therefore is not repeated in detail. Furthermore, it is worth noting that conventional couplings used in rotation sensors generally include coupling mechanisms made of metal, where shifting motions in the coupling mechanisms are absorbed by the elasticity of the coupling mechanisms themselves. Thus, the coupling mechanisms are generally complex, 3-dimensional structures made from a single substrate (such as a metal sheet). The complex shapes enable the coupling to prevent relative motion in a rotational sense between a rotor and a base to be restricted, while motion in either one dimension or another dimension of an x-y plane is permitted. This motion in the x-y plane is accomplished by having the coupling absorb the translational movement by compression, and extension of the resilient portions of the coupling. Conventional couplings interconnect an inner member to an outer member by way of "rails" formed in the coupling. A second set of rails interconnects the outer member to a base.

A market for rotation sensors and couplings for use in a rotation sensor is the highly competitive automotive parts industry. The manufacturing environment for products supplied to automotive manufacturers is highly competitive in terms of product price, size and weight, and maintainability. Furthermore, automotive manufacturers often require "second sourcing" for automotive parts to avoid the risk inherent with receiving parts from a sole-source provider. One limitation with being able to obtain quality parts from a "second-source," is the compatibility of one manufacturer's coupling for use in a general rotation sensor. For example, one coupling may be designed in a compatible fashion with surrounding components, by accounting for weight, moment of the second rotating plate, and friction with the surrounding components, because the shaft and the second rotating plate are interconnected by the elastic coupling component. However, if there is a change in the surrounding parts, the compatibility, and ultimately the reduced reliability of the coupling or the rotation sensor itself, may be compromised.

FIG. 13 shows a portion of an automobile, to which the rotation sensor (and the coupling therefore) may be mounted to a steering handle 10 that is directly coupled to a column shaft 12. The steering shaft is coupled through a torsion bar 14 to the column shaft 12 and on the other end is coupled to an electrically-operated power steering mechanism 18. This power steering mechanism accommodates the rack and pinion for steering front wheels 19 and an electric motor for assisting a steering operation.

During the steering operation, the torsion bar 14 couples the column shaft 12 with the steering shaft 16 and receives a reactive twisting force from a road surface. As a result, a rotational deviation occurs between the column shaft 12 and the steering shaft 16. Rotation sensors serve the general function of identifying the rotational deviation and therefore the reaction torque that is applied to the steering shaft 16 and in turn the steering handle 10.

SUMMARY OF THE INVENTION

An object of the present invention is to address the above-identified and other limitations of conventional rotation sensors and couplings used in the rotation sensors.

The present inventor recognized that a problem with conventional systems is that because they are based on integral structures, the burden of accommodating shifting forces in the steering mechanism rests on the bending elasticity of the coupling mechanism. However, the complexity of the coupling mechanism required to provide a sufficiently large difference in stiffness between the angular direction and lateral direction, results in a complex structure that is difficult to manufacture. Such a part would also be unique to the surrounding components used with it.

The present inventor also recognized that the elasticity of the conventional couplings needs to be a design consideration that takes into account the unique weight, moment of the second rotating plate, and the friction with the surrounding components, so that the shaft and the second rotating plate may be accurately coupled by way of the coupling. However, any change in surrounding components, either for one particular car model, or others, may compromise the operational effectiveness of the coupling, based on the insufficient elasticity of the coupling for the modified environment in which it is used.

In light of these problems, the present inventor recognized that a multi-component coupling, that does not exclusively rely on elasticity, would offer benefits in terms of simplified manufacturability, ability to operate in multiple environments with differing surrounding parts, and is easily replaceable. Functional attributes of the present invention as recognized by the present inventor are that the coupling is able to transfer the angular motion of the shaft accurately to the second turntable (or plate) and can do so without damping or delay.

Another attribute of the present invention is that by having a coupling with separate subcomponents that cooperate with one another, it is possible to allow sufficient tolerance against, or even absorbing, the lateral or vertical shifting motions of the shaft or the tumbling motion of the shaft and as a result to suppress the deterioration of the sensing function, which is present in conventional devices.

These and other objects are addressed by way of the present invention. A non-exhaustive list of attributes of the present invention include a multi-component coupling mechanism that includes projections, and recesses that receive the projections so that the relative motion of the respective subcomponents, may be controlled, mainly allowing motion in a lateral and vertical directions, but not in a relative rotational context.

According to one aspect of the invention, a coupling includes a first coupling member, a second coupling member, and a third coupling member being located in between the first coupling member and the second coupling member. The third coupling member has formed thereon a first pair of connecting elements diametrically opposed to one another and defining a first axis, and further has formed thereon a second pair of connecting elements diametrically opposed to one another and defining a second axis that is substantially perpendicular to the first axis. The first coupling member has formed thereon a third pair of connecting elements configured to conform to the first pair of connecting elements of the third coupling member. Formed on the second coupling member is a fourth pair of connecting elements configured to conform to the second pair of connecting elements of the third coupling member.

Another aspect of the invention is a rotation sensor including a casting having a coupling contained therein. The coupling includes a first coupling member, a second coupling member, and a third coupling member being located in between the first coupling member and the second coupling member. The third coupling member has formed thereon a first pair of connecting elements diametrically opposed to one another and defining a first axis, and further has formed thereon a second pair of connecting elements diametrically opposed to one another and defining a second axis that is substantially perpendicular to the first axis. The first coupling member has formed thereon a third pair of connecting elements configured to conform to the first pair of connecting elements of the third coupling member. Formed on the second coupling member is a fourth pair of connecting elements configured to conform to the second pair of connecting elements of the third coupling member.

In still another aspect of the invention a coupling includes a first coupling member, a second coupling member, and a third coupling member being located in between the first coupling member and the second coupling member. Also included are means for joining the first coupling member to the third coupling member, and means for joining the second coupling member with the third coupling member.

DETAILED DESCRIPTION OF THE PREFERRED EMBODIMENTS

Figure 1:
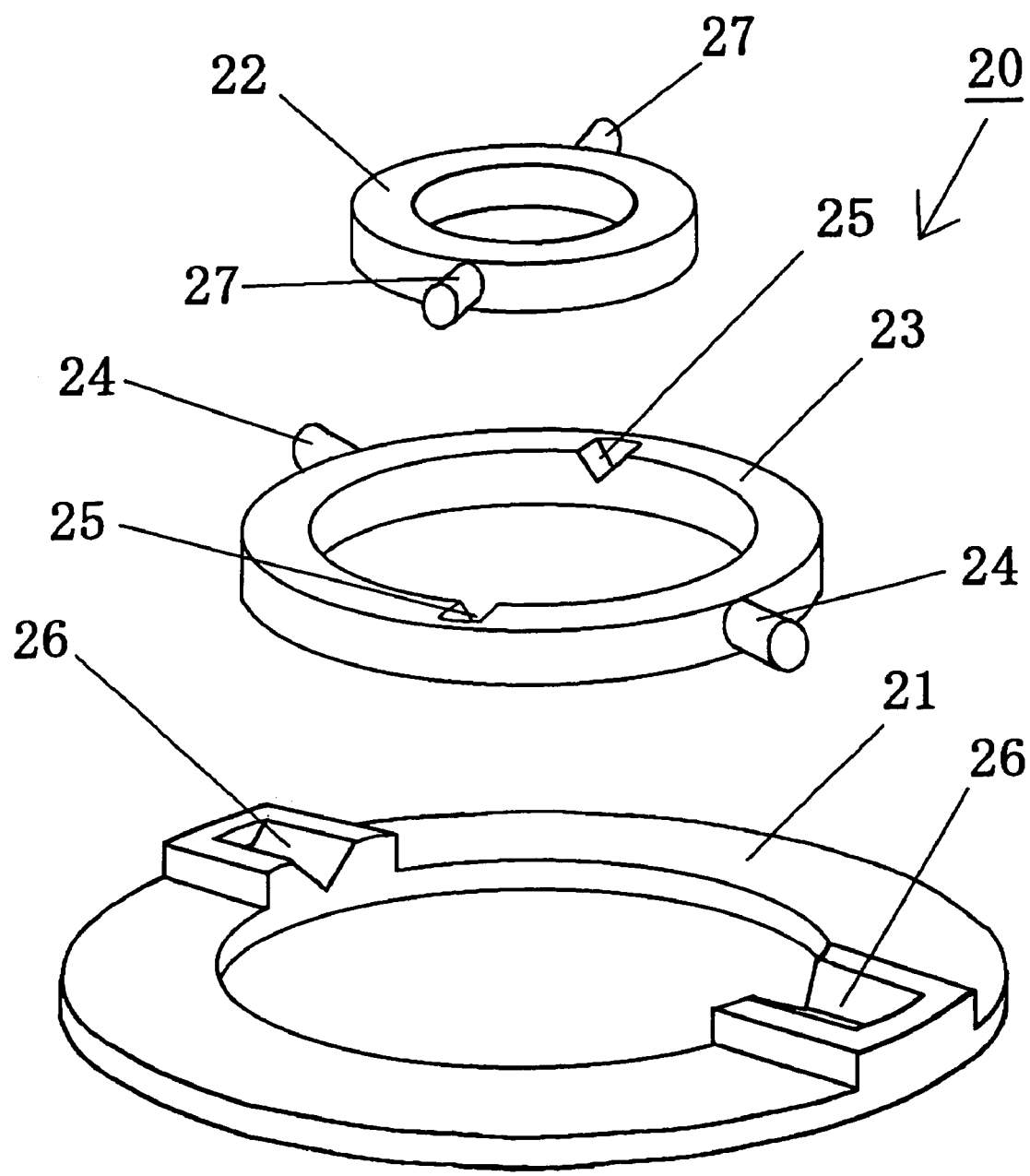
FIG. 1 is a perspective view of respective subcomponents of a coupling according to the present invention.

Embodiments of the present invention will now be described hereinafter in detail with reference with the accompanying drawings. FIG. 1 is a perspective view of the respective subcomponents of a coupling 20. These subcomponents include a first coupling ring 21, a second coupling ring 22, and a third coupling ring 23. The third coupling ring 23 is of a ring shape (a portion of a cylinder) and includes a pair of connecting projections 24 disposed on an outer circumferential surface of the third coupling ring 23, at diametrically opposed positions along a first diameter. Facing an inner portion of the third coupling ring 23, at diametrically opposed positions are v-grooves 25. The grooves 25 are positioned along a second diameter, which is perpendicular to the first diameter. Although the grooves (v-shaped grooves) 25 are shown as v-shaped, flat or U-shaped grooves are examples of other acceptably-shaped grooves as well. Other shapes may be used as well, where the design consideration is to reduce the number of contact points (or surface area) between the projections and grooves, so as to permit motion along the second diameter, of the second ring 22 that will fit therein. The material for the third ring 23, may be metal, plastic, epoxy resin or other material (or combination of materials, such as Teflon coated substrates) that provides a relatively easy material to manufacture, yet provides the rigidity and durability associated with frequent use in an automobile environment, regardless of the surrounding components.

The first coupling ring 21 includes a pair of v-grooves 26 formed on an upper surface of the ring 21. The v-grooves 26 are diametrically opposed to one another on the ring 21, and positioned so as to receive the connecting projections of the third coupling ring 23. Moreover, the third coupling ring 23 has an outer diameter that is shorter than the inner diameter of the first ring 21. However, the distance from one end of a first of the projections 24 on the third ring, and outer end of the second projection 24 on the third ring 23, is such that they are received by the grooves 26. Once in the grooves 26, the projections are free to slide along the first diameter direction. By having the third coupling ring 23 disposed within the grooves 26, the third coupling ring 23 is free to rotate with the first ring 21 and can unilaterally shift along the first diameter in the v-grooves 26.

The second coupling ring 22 also includes a pair of projections 27, which sit within the v-grooves 25 of the third coupling ring 23. Thus, the second coupling ring 22 can freely rotate with the first ring 21 and the third ring 23, but is able to unilaterally move in the v-grooves 25 along the second diameter.

Figure 2:
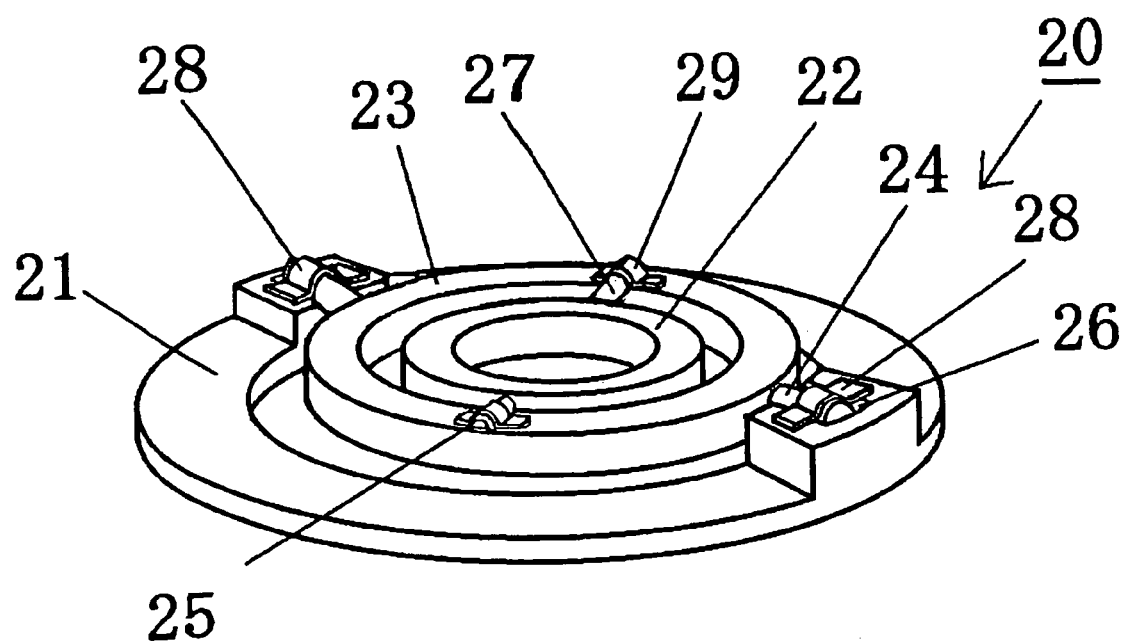
FIG. 2 is the same coupling as shown in FIG. 1, although the subcomponents are placed together and held in place by elastic members which permit limited motion in a z-direction, perpendicular to an x-y plane.

FIG. 2 is a diagram of an assembled coupling component 20. As can be seen, the third ring 23 is allowed to move a limited distance along the first diameter of the first ring 21, but is restricted in its movement in a perpendicular direction or in a rotational direction. The movement of the third ring 23 along the first diameter is restricted by the outer circumferential surface of the third ring 23 contacting the inner surface of the first ring 21.

Spring plates 28 and 29 are attached (or integrally formed) to respective surfaces of the rings on which the grooves are formed, and placed overtop of the projections that fit into the grooves. When arranged this way, the third coupling ring 23 is able to move in a limited range in an axial direction (z direction, relative to an x-y plane in which the respective rings are disposed), only restrained by the elasticity of the spring plates 28 and 29. The spring plates 28 and 29 may be made of a resilient metallic material, or another material that has some elasticity and durability, such as elastic bands or straps.

The coupling rings 21 and 22 are connected by way of the third coupling ring 23, even though the upper or lower surfaces of the coupling ring 21 and coupling ring 22 are not necessarily co-planar. Furthermore, a lateral shift between the two coupling rings 21 and 22 is absorbed by way of a "sliding" motion of the connecting projections 24 and 27 in the v-grooves 26 and 25, respectively. As a consequence, the movement of the respective rings need not absorb the motion by way of the elasticity of the materials used to make the coupling mechanism. The sliding motion is possible, by using the subcomponents that fit into one another and are held by the elastic spring plates 28 and 29.

While the v-grooves 26, are shown to be built on ridges on an otherwise planar surface of the first ring 21, the grooves 26 may be integrally formed so as to be below the surface of the ring 21, thereby making the upper surfaces of the rings 22 and 23 more co-planar with the upper surfaces of the ring 21. While there may be some applications where co-planar operation is useful, there also are numerous applications where the co-planar structure is not required.

Figure 3:
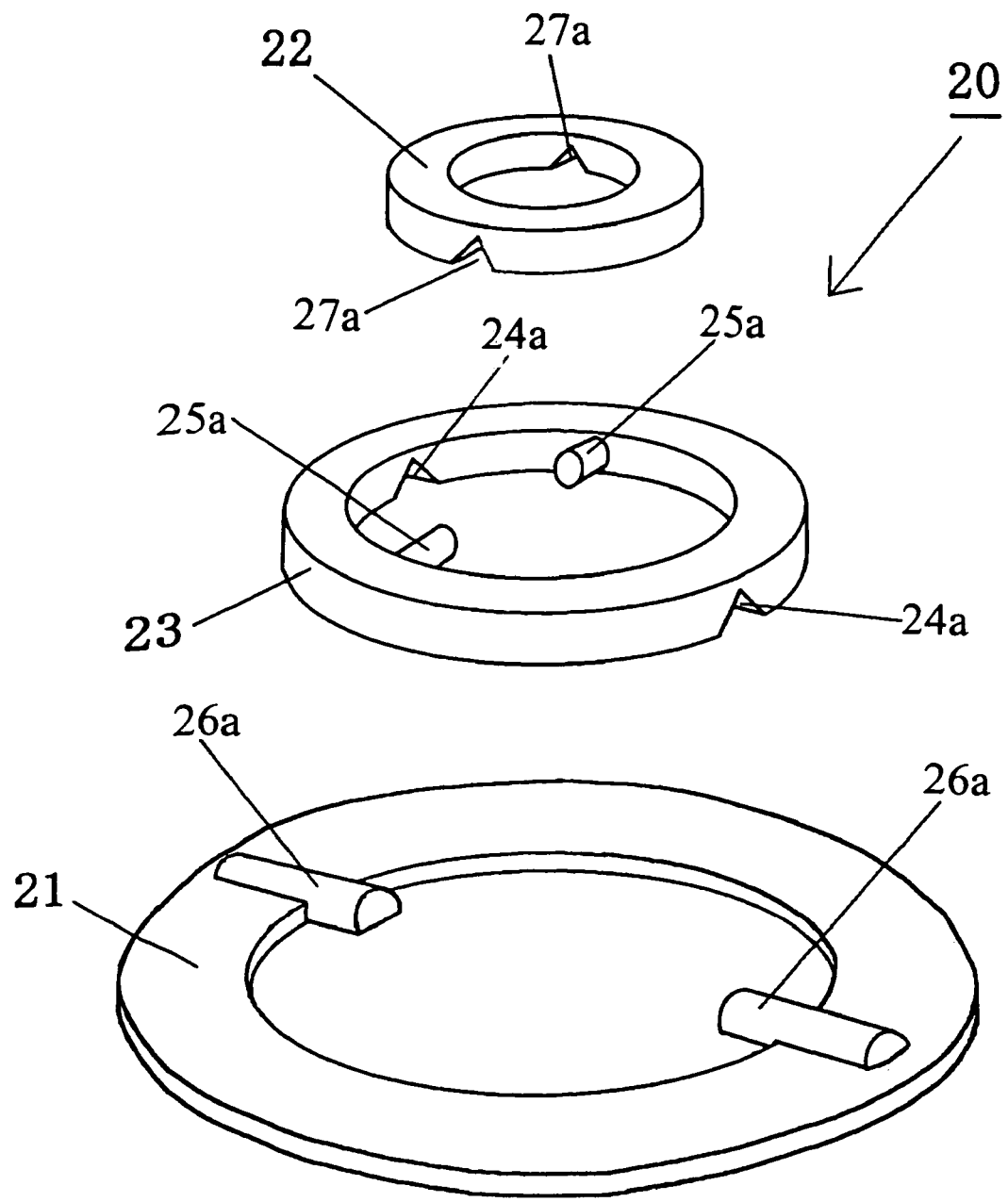
FIG. 3 is a perspective view of another embodiment of the coupling according to the present invention.

FIG. 3 shows an alternate embodiment, where the first connection ring 21 includes connecting projections 26a having a flat bottom surface formed to be co-planar with the bottom surface of the connecting ring 21, but on an upper surface thereof contain a ridge, which is an upper portion of a half cylinder shape. The connecting portions 26a also projects "in-ward" from an interior circumferential surface, rather than being disposed on an outer surface of the connecting ring 21. As a consequence, the third ring 23 includes v-grooves 24a, formed on the bottom surface thereof that are positioned to receive the connecting portions 26a when the third ring 23 is positioned over top of the first ring 21. The projecting portions 26a carry the third ring 23, such that the third ring 23 is free to move along the diameter defined by the two projecting portions 26a. However, the motion of the third ring 23 is restricted in a direction that is transverse to the diameter defined between the projection connecting portions 26a.

The third ring 23 also includes inwardly extending connecting portions 25a that as are of a cylindrical shape. Because the connecting portions 25a on the third connecting ring 23 are inwardly directed, v-grooves 27a are formed on a bottom outer surface of the second ring 22. In this way, when the second ring 22 is placed over top of the third ring 23, the connecting portions 25a sit within the v-grooves 27a of the second connecting ring 22. In this way, the second connecting ring 22 is free to move in the direction that is traverse to the first diameter defined by the connecting portions 26a on the first ring 21, but are restricted from moving along the first diameter direction. When the three rings are placed together as previously discussed, a torque shaft may be moved either along the first diameter defined by the connecting portions 26a or traverse to it, but not rotated relative to the other rings. As was the case with the embodiment shown in FIG. 2, elastic members such as spring plates may be placed over top of the coupling portions so as to hold the connecting portions within the respective v-grooves.

Figure 4:
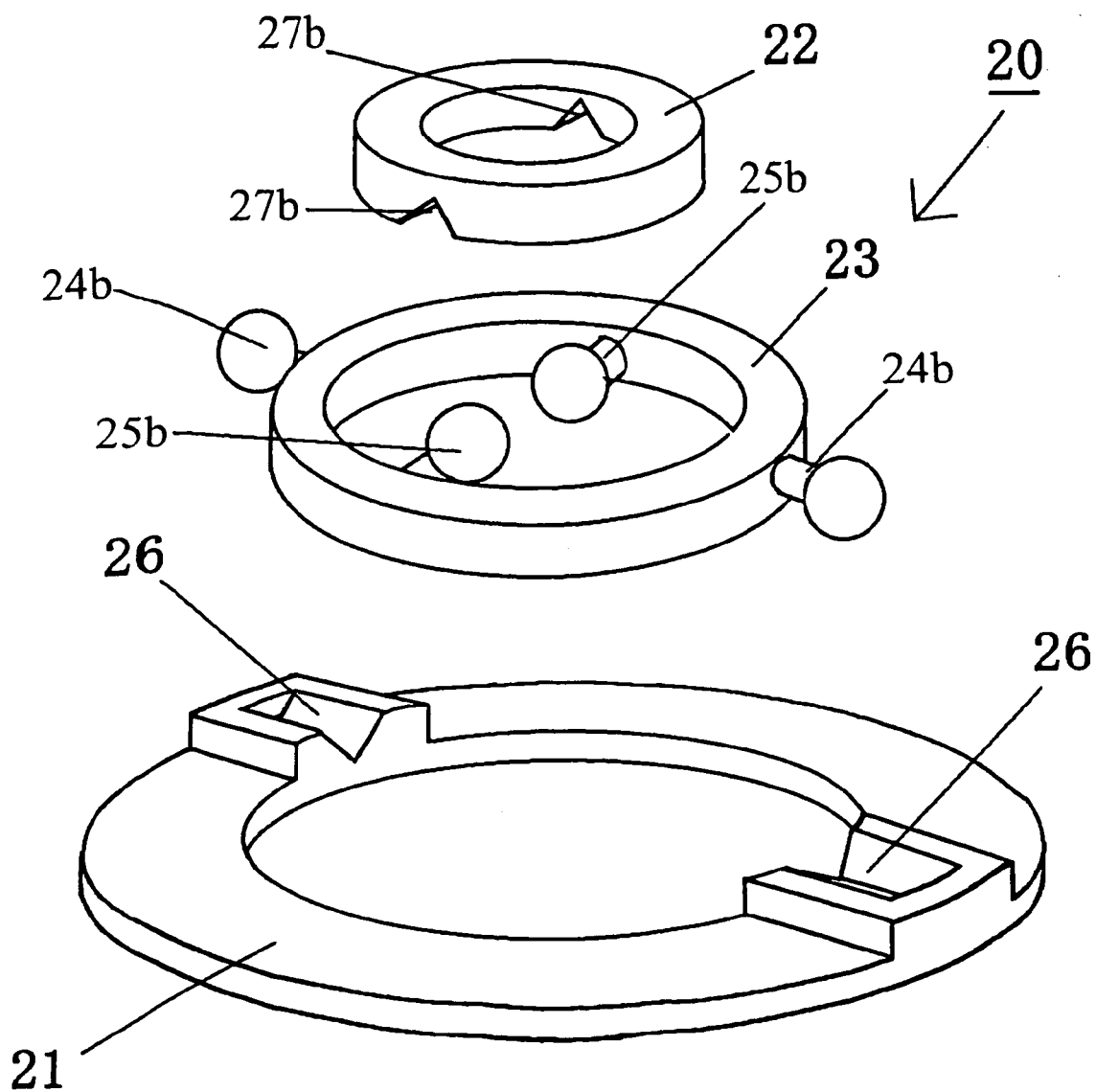
FIG. 4 is another embodiment of the coupling according to the present invention.

FIG. 4 is another embodiment of the present invention. In this embodiment the first coupling ring 21 is like that previously discussed with regard to FIG. 1. Likewise, the second coupling ring 22 is like that previously discussed with regard to the embodiment discussed in FIG. 3. However, the third coupling ring 23 includes connecting portions 24b which are disposed on outer surface of the third coupling ring 23, at diametrically opposed positions. A second pair of connecting projections 25b are disposed on an inner surface of the third coupling ring 23 and along a diameter that is traverse to the diameter defined between the projection portions 24b. In this embodiment, the connecting projections all include a sphere on an outer end portion thereof. The sphere contacts the inclined sides of the v-grooves 26 and 27b at two positions. By minimizing the number of contact points in the v-grooves lowers the amount of friction thus permitting sliding action along the designated diameters. The amount of friction can be controlled by coating the surface(s) of the sphere and/or v-groove with a material (such as a resin, or TEFLON) with a predetermined coefficient of friction, and/or by roughening the contact surfaces. As was the case with the previous embodiments, elastic members such as spring plates may be placed over top of the connecting projections 24b and 25b such that the respective rings are held together and permit translatory motion in a z-direction (perpendicular to the x-y plane defined by the two diameters of the connecting portions).

Figure 5:
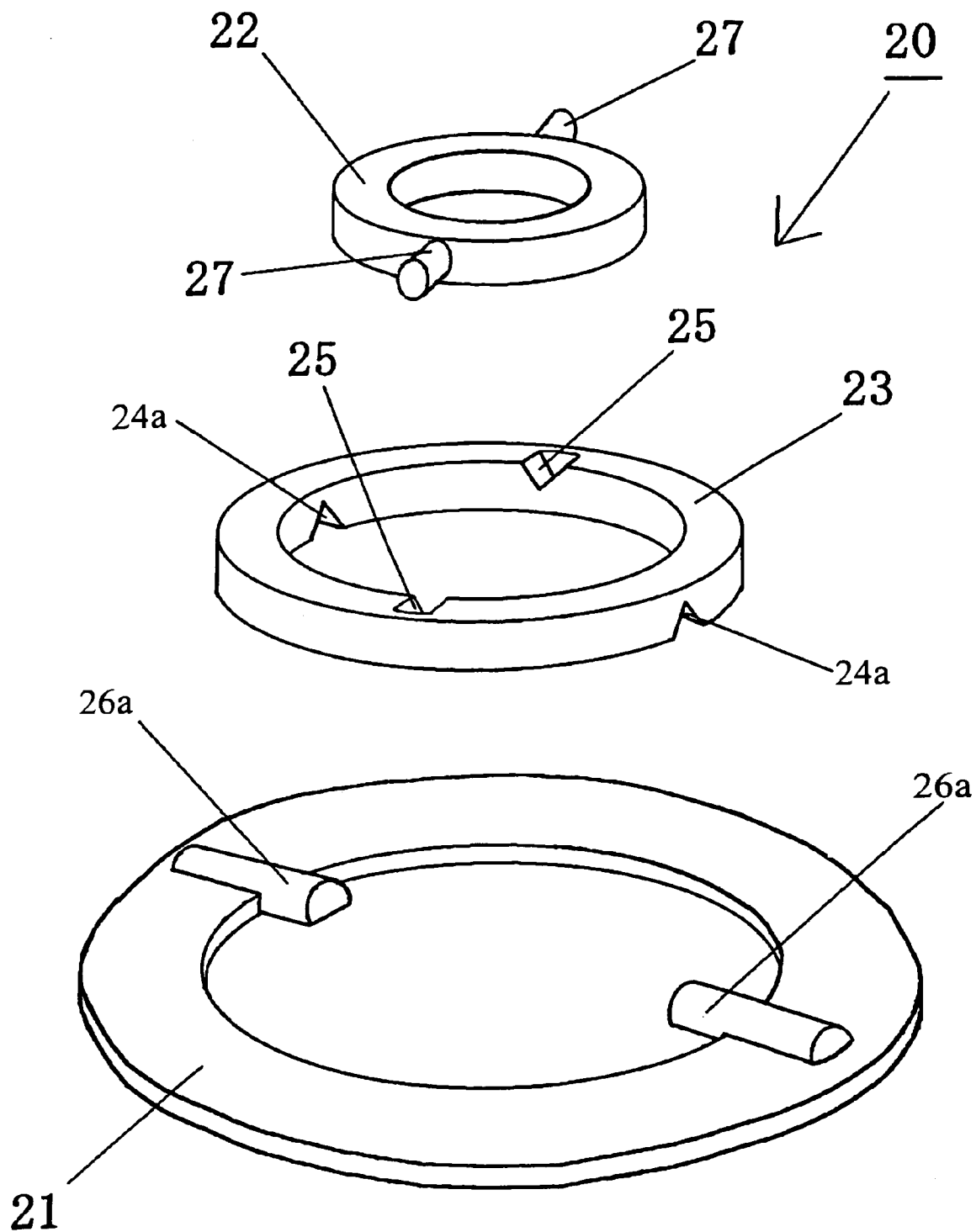
FIG. 5 is yet another embodiment according to the present invention.

FIG. 5 shows yet another embodiment of a connector according to the present invention, where the third ring 23 includes only v-grooves, and no connecting projections. V-grooves 24a are positioned to receive connecting portions 26a of first coupling ring 21. V-grooves 25 are formed on an upper surface of the third ring 23 so as to receive the connecting portions 27 on the second ring 22. As with the other embodiments, the combined structure (perhaps combined with the use of elastic members to hold the respective projections in the grooves) may permit motion in a first diametric direction, or a second diametric direction that is traverse to the first diametric direction, but not in a relative (with regard to the rings) rotating direction. The elasticity of the spring members used to hold the respective parts together will define the amount of motion that is permitted in the z direction.

Figure 6:
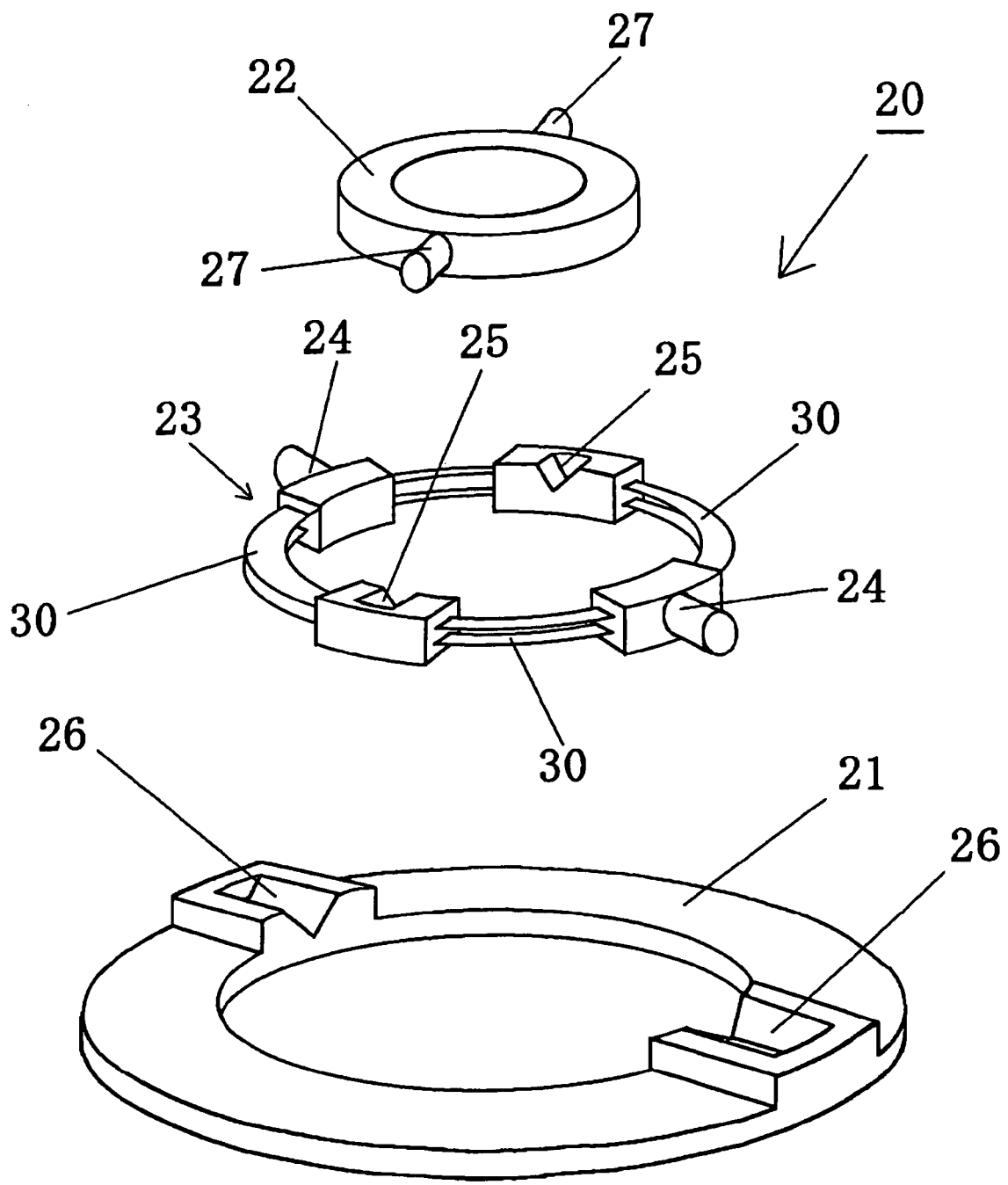
FIG. 6 is another embodiment of a coupling according to the present invention.

FIG. 6 is yet a further embodiment where the third coupling ring 23 includes a set of parallel spring feet 30, a pair of connecting projections 24 and a pair of v-groove components. In this case, the parallel spring feet are configured to absorb a shift between the first coupling ring 21 and the second coupling ring 22 along the axis that is perpendicular to the plane in which the first ring 21 is positioned.

Figure 7:
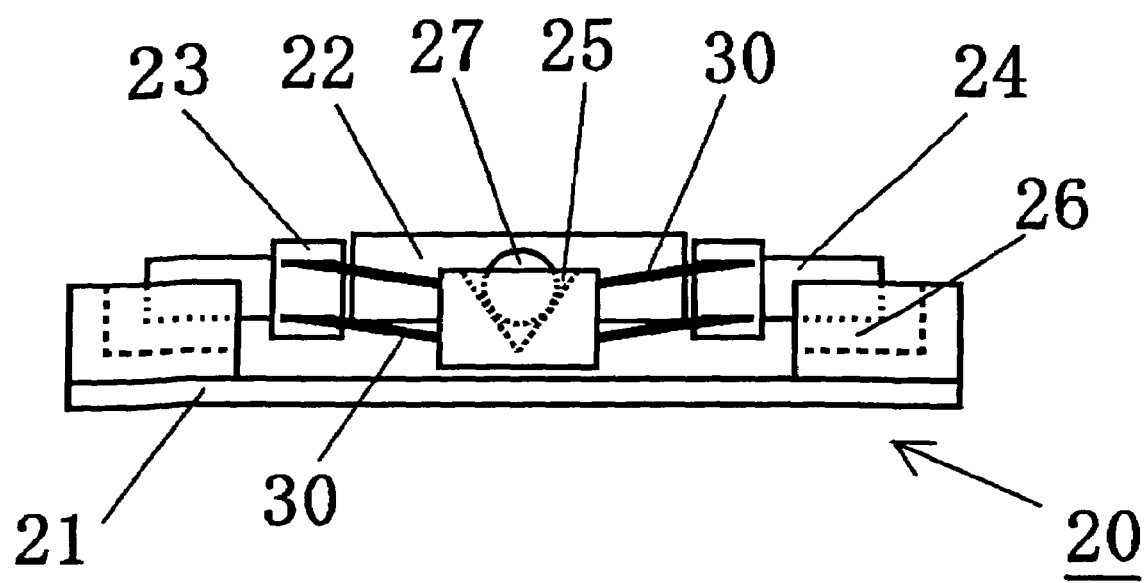
FIG. 7 corresponds with the coupling in FIG. 6, although is shown in an assembled configuration.

FIG. 7 shows an assembled version of the coupling of FIG. 6 with the respective positioning of the projection portions within the v-grooves. Furthermore, the projection portion 27 is shown to have 2 contact points within the v-groove 25. This type of connection minimizes the amount of fixing between these parts so as to enable free movement of the projection portion 27 in one dimension within the v-groove 25, namely along the crux portion of the v-groove 25. While the connecting projections have previously been shown as a spherical, cylindrical, or half-cylindrical shape, they may also be half circles or, when viewed in cross-section, arc-shaped. Furthermore, the shapes of the grooves have been illustrated as v-groove shapes may be other receptacles as well. The present inventor recognized that the amount of resistance to movement is a function of the nature of the contact surfaces. Thus, the bottom may be u-shaped or flat, depending on the shape of the projection that fits therein. Less preferably, a shape such as a u-shape in combination with a cylindrical shape may be used, but the area of contact surface would increase, thereby increasing the personal coefficient between the projections. Nevertheless, it is contemplated that such structures may be included as an attribute of the present invention.

Each of the above described embodiments may also include resiliency members (such as a spring) placed in the v-groove, or receptacle. For example, as shown in FIG. 1, a spring may be placed in each v-groove 26 such that each spring presses against the outer vertical wall in the v-groove portion, and the other end of the spring biases the projection toward the center of the first ring 21. In this way, the third ring 23 returns to a center position after being pushed further into one of the two v-grooves 26. Alternatively, the projections may include spring members formed thereon, or if the spring material is stiff enough, it may be used as the projection. A solid, but resilient material, such as rubber may be used as the material that forms the projections.

The table below, shows the respective combinations that may be used between the first coupling ring, third coupling ring and second coupling ring with regard to combinations of projections and grooves.

| No. | The first Coupling | The third Coupling | The second Coupling |
|---|---|---|---|
| 1 | The 3$^{rd}$ connecting projections | The 1$^{st}$ V-grooves The 2$^{nd}$ connecting projections | The 4$^{th}$ V-grooves |
| 2 | The 3$^{rd}$ connecting projections | The 1$^{st}$ V-grooves The 2$^{nd}$ V-grooves | The 4$^{th}$ connecting projections |
| 3 | The 3$^{rd}$ V-grooves | The 1$^{st}$ connecting projections The 2$^{nd}$ connecting projections | The 4$^{th}$ V-grooves |
| 4 | The 3$^{rd}$ V-grooves | The 1$^{st}$ connecting projections The 2$^{nd}$ V-grooves | The 4$^{th}$ connecting projections |

Once again, need not be limited to a cylindrical (or circle when viewed in cross-section), half cylinder, or spherical shape. Likewise, the receptacles need not be formed as V-grooves. Other shaped receptacles could be used as well, including U-shaped or flat grooves (for example).

Advantages of the present invention, and the embodiments as presently shown, include the attribute that the coupling structure is simple as compared to the complex integral shape of conventional devices. Furthermore, fabrication of such devices does not include complex shapes, or complex manufacturing processes.

Another advantage is that the sliding action of the respective rings, made possible by way of the cooperating projections and grooves, enables the absorption of shifting motions of the shaft and helps avoid a kink in the shaft so as to enable accurate transfer of the angular motion.

Furthermore, by having the sliding action of the subcomponents within one another, the structure offers the benefit of transferring less vibration to the electrical contacts, which is an inevitable detriment of conventional coupling mechanisms based on a single elastic metallic sheet formed from a single piece of metal. Furthermore, no backlash is experienced since the projection shaft is held into the V-groove with an elastic member. Thus, the amount of wear and backlash, which is often the problem in combination of shafts and sockets, can be reduced, if not eliminated.

Figure 8:
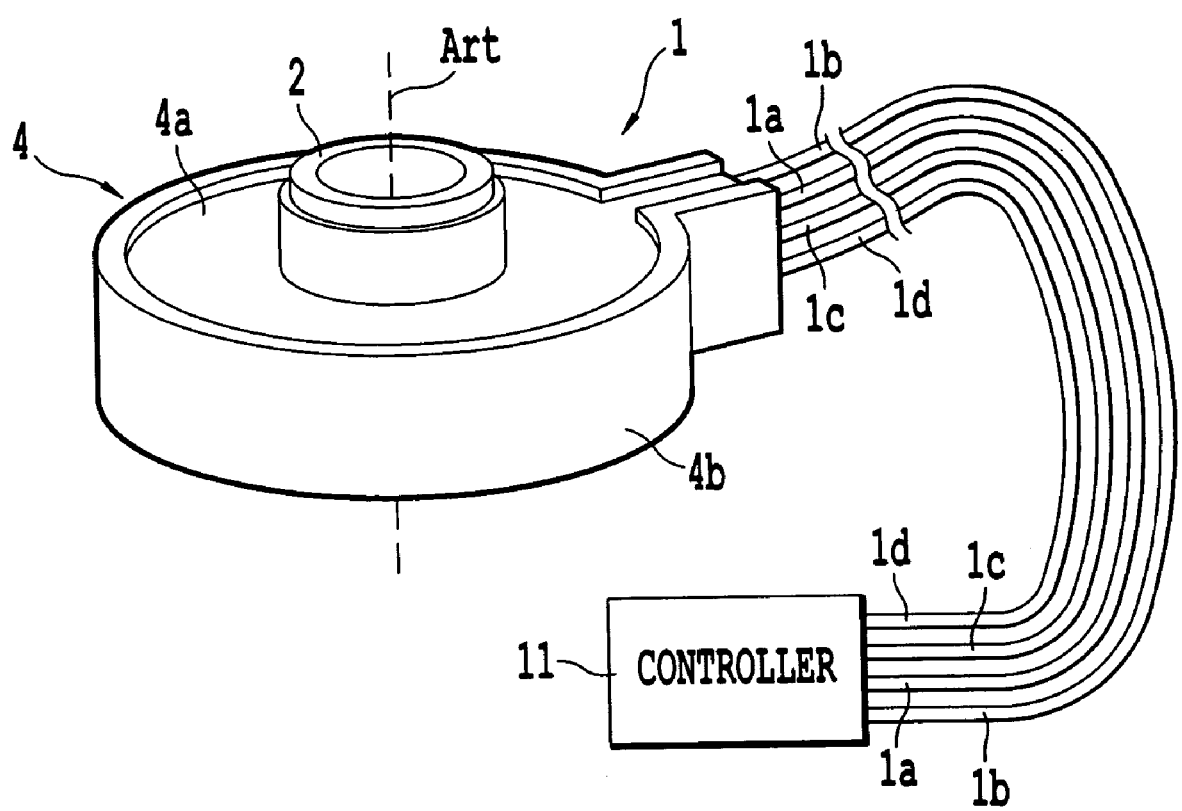
FIG. 8 is a perspective view of a rotation sensor that includes one of the couplings embodiments of the present invention.

FIG. 8 is a perspective view of a rotation sensor 1 in accordance with the present invention. Rotation sensor 1 may incorporate the coupling mechanisms previously discussed in FIGS. 1–7. The rotation sensor 1 has an active rotor 2 in a fouler rotor (not shown) having a common rotation axis $A_{rt}$ and is contained in a casting 4 having a vessel 4b and a lid 4a. The rotation sensor 1 is supplied with electric power through one of the cables 1a, 1b, 1c, and 1d, from a feeder unit inside a controller 11. Additionally, the rotation sensor 1 sends detected voltages indicative of steering angle and torque to be measured, respectively, through one or more of the wires 1a, 1b, 1c, or 1d. Likewise, the wires 1a–1d are used for passing signals with regard to torque measurement for use by a steering-angle measuring computing unit and a torque computing unit arranged inside the controller 11 respectively.

Figure 9:
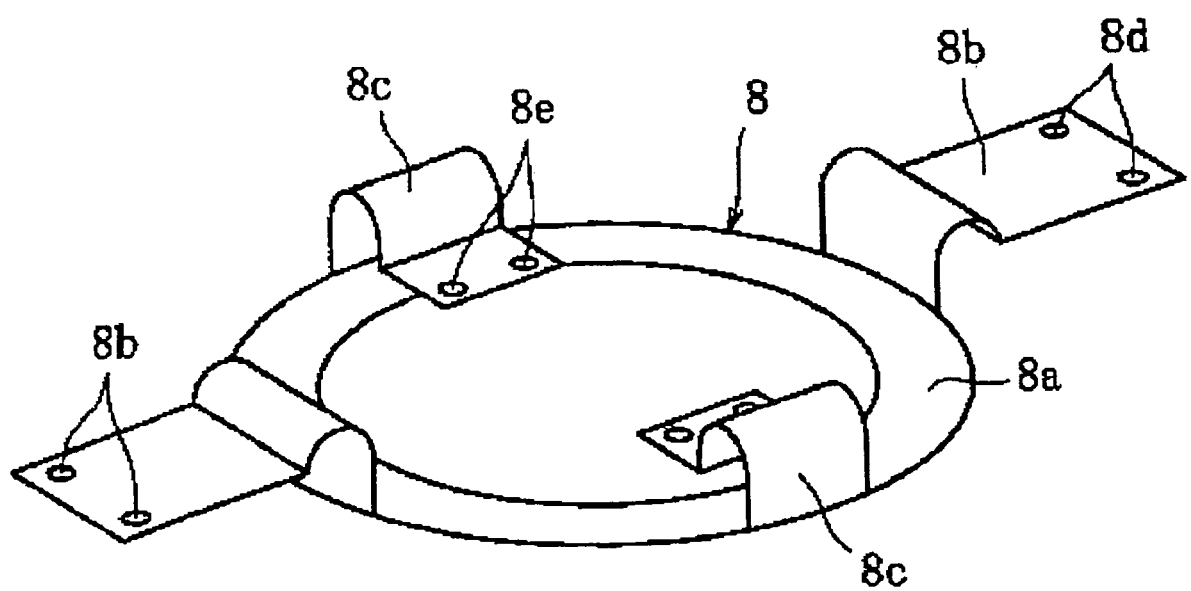
FIG. 9 is a perspective view of another coupling, that uses an integral, single piece construction.
Figure 11:
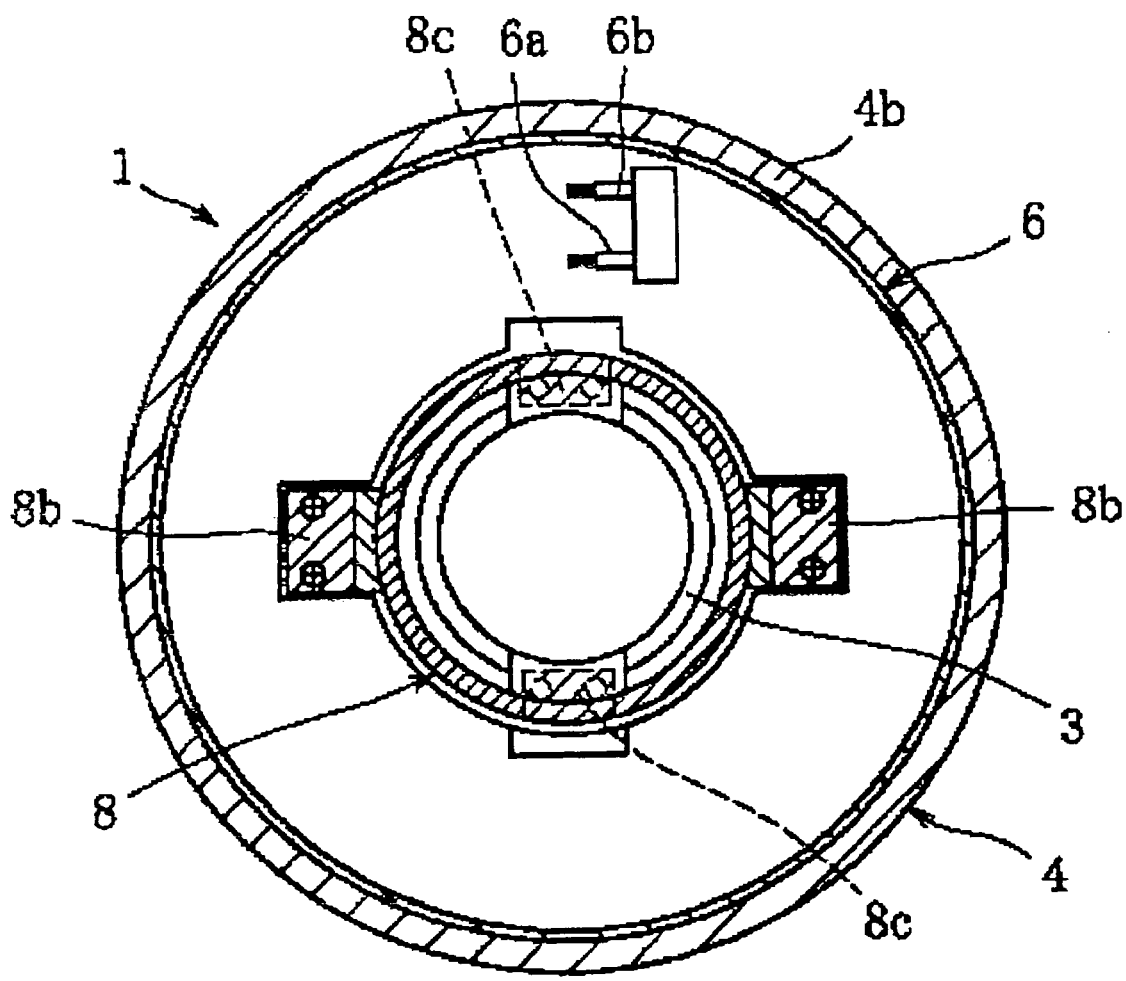
FIG. 11 is a plan view of a torque sensor that includes the coupling of FIG. 9.

For simplicity, a single "integral" coupling ring 8, having respective resiliency members 8c and opposing resiliency members 8b is now described so as to simplify the subsequent description in regards to FIG. 11. However, it should be recognized that the rotation sensor according to the present invention may also use and preferably uses the other coupling mechanisms disclosed herein (FIGS. 1–7, for example). The coupling ring 8 in FIG. 9, includes mounting holes 8b, 8d, and 8e for attachment to a base unit. The ring 8a interconnects the respective elastic members disposed about it.

Figure 10:
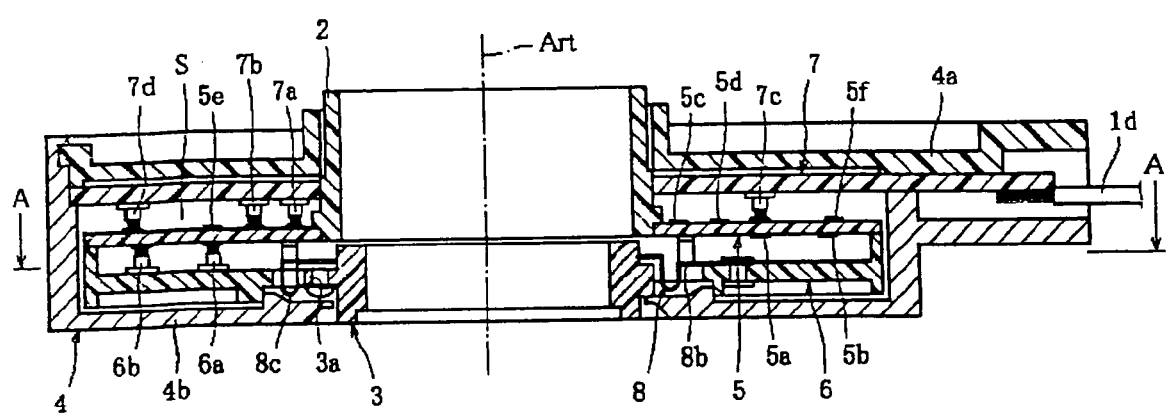
FIG. 10 is a cross-section of a rotation sensor according to the present invention.

FIG. 10 is a cross section view of a rotation sensor according to the present invention. Once again the coupling mechanisms previously discussed may be substituted for the coupling mechanism shown in FIGS. 9 and 10. A detailed description of the corresponding structure is shown in FIG. 3 of U.S. patent application Ser. No. 10/316,442 now issued as U.S. Pat. No. 6,725,734 B1, and therefore will not be repeated here. FIG. 11 is a top view of a coupling mechanism 8 of FIG. 9 and has parts that correspond with those shown in FIG. 10, although from a cross-sectional view.

Figure 12:
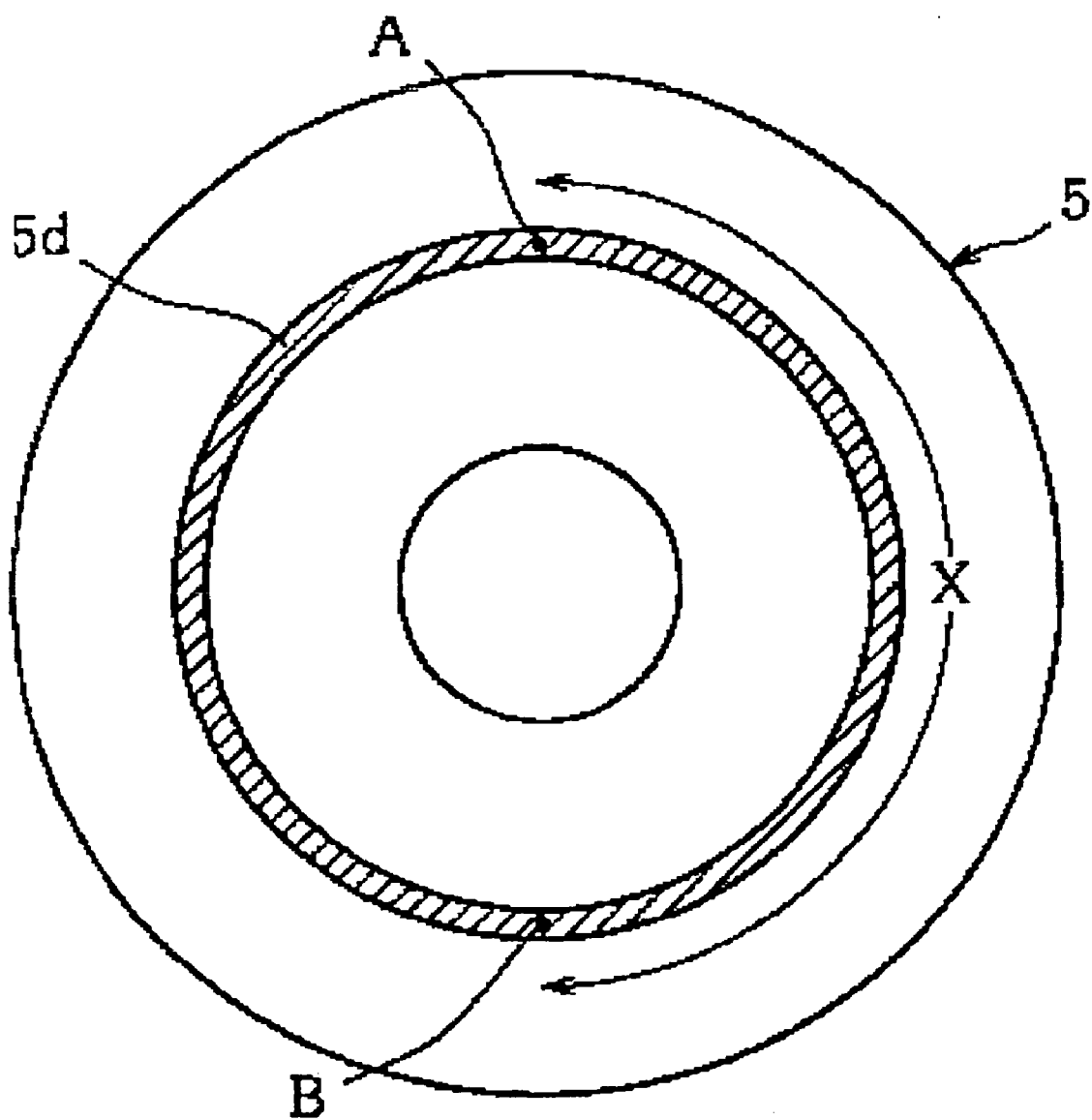
FIG. 12 is a schematic plan view of a base plate of a rotation sensor according to the present invention.
Figure 13:
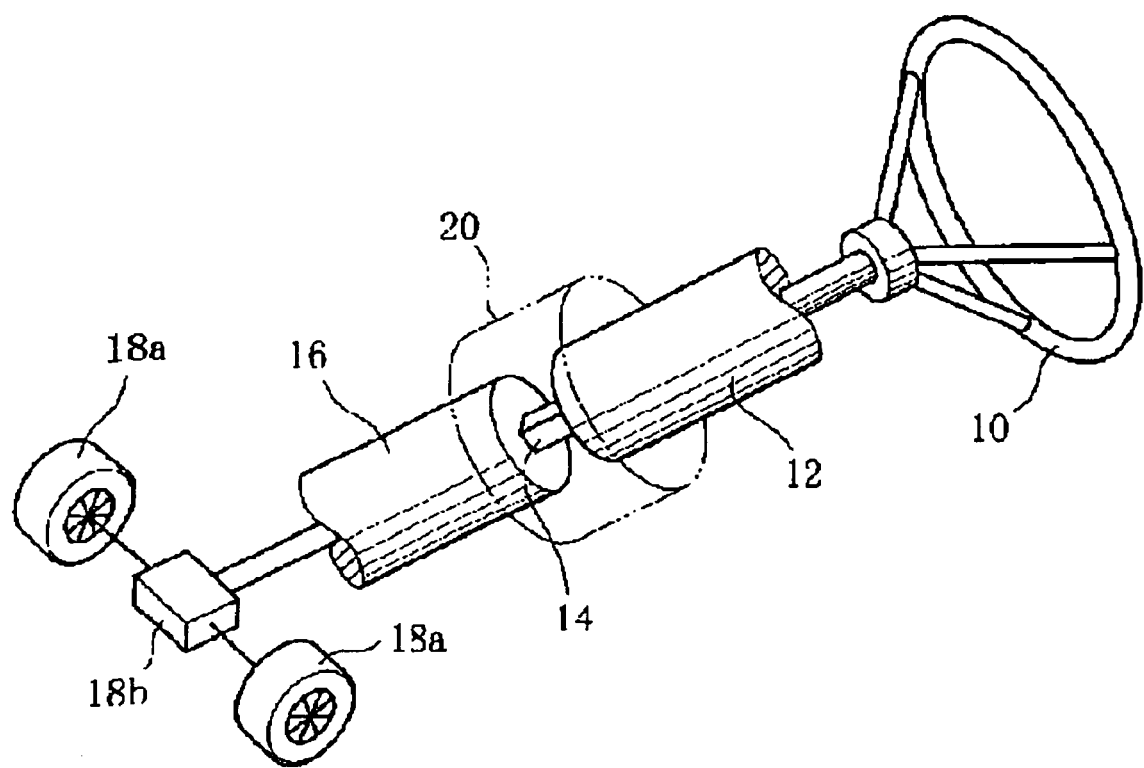
FIG. 13 shows a portion of an automobile, to which a rotation sensor can be mounted.

FIG. 12 is a plan view of an upper face of a base plate 5, that includes the electrical resistor 5d. The electrical resistor 5d is for steering angle detection. The resistor 5b is formed by electrically conductive resin by using a printed circuit board forming technique, as an example. As shown in FIG. 12, the electrical resistor 5d is formed into an annular shape and has two reference points A and B that are spaced at a circumferential distance of x on the electrical resistor 5d. A predetermined reference voltage is applicable across the reference points A and B. The operation of this resistor in cooperation with the brushes and base plate is described in U.S. application Ser. No. 10/336,991, and therefore will not be repeated herein.

The present invention is not limited to the specific embodiments described hereinabove. All suitable modifications and equivalents may be regarded as falling within the scope of the invention as well as equivalents of the disclosed invention.

What is claimed is:

1. A coupling comprising:
   a first separate coupling member;
   a second separate coupling member;
   a third separate coupling member being located in between said first coupling member and said second coupling member;

said third coupling member having formed thereon a first pair of connecting elements diametrically opposed to one another and defining a first axis, and further having formed thereon a second pair of connecting elements diametrically opposed to one another and defining a second axis that is substantially perpendicular to said first axis;

said first coupling member having formed thereon a third pair of connecting elements configured to conform to said first pair of connecting elements of the third coupling member;

said second coupling member having formed thereon a fourth pair of connecting elements configured to conform to said second pair of connecting elements of the third coupling member; and wherein said first coupling member and said third coupling member rotate around said first axis, and said second coupling member and said third coupling member rotate around the second axis.

2. A coupling according to claim 1, wherein:

each connecting element of said first pair of connecting elements comprises a recess or a projection with an outer surface having a curve thereon, and said third pair of connecting elements comprises a recess corresponding to each projection of the first pair of connecting elements and a projection with an outer surface having a curve thereon corresponding to each recess of the first pair of connecting elements.

3. A coupling comprising;

a first separate coupling member;

a second separate coupling member;

a third separate coupling member being located in between said first coupling member and said second coupling member;

said third coupling member having formed thereon a first pair of connecting elements diametrically opposed to one another and defining a first axis, and further having formed thereon a second pair of connecting elements diametrically opposed to one another and defining a second axis that is substantially perpendicular to said first axis;

said first coupling member having formed thereon a third pair of connecting elements configured to conform to said first pair of connecting elements of the third coupling member;

said second coupling member having formed thereon a fourth pair of connecting elements configured to conform to said second pair of connecting elements of the third coupling member:

each connecting element of said first pair of connecting elements comprises a recess or a projection;

said third pair of connecting elements comprises a recess corresponding to each projection of the first pair of connecting elements and a projection corresponding to each recess of the first pair of connecting elements; and a resiliency member placed in said recess of the first or third pair of connecting elements to bias a projection corresponding to the recess toward a center of the coupling.

4. A coupling according to claim 1, wherein:

each connecting element of said second pair of connecting elements comprises a recess or a connecting projection with an outer surface having a curve thereon, and said fourth pair of connecting elements comprises a recess corresponding to each connecting projection of the second pair of connecting elements and a connecting projection with an outer surface having a curve thereon corresponding to each recess of the second pair of connecting elements.

5. A coupling according to claim 1, wherein:

said third coupling member is configured to absorb a shift along an axis that is substantially perpendicular to a plane in which the first coupling member is positioned.

6. A coupling according to claim 1, wherein:

said first second and third coupling members each comprise a substantially ring shaped member; and said ring shaped members are positioned concentric to one another about an axis of rotation and are substantially coplanar to one another along a plane orthogonal to the axis of rotation.

7. A coupling according to claim 6, further comprising a spring mechanism configured to allow said ring shaped members to move relative to one another along said axis of rotation.

8. A coupling according to claim 7, wherein said spring mechanism comprises spring plates.

9. A coupling comprising:

a first coupling member comprising a substantially ring shaped member;

a second coupling member comprising a substantially ring shaped member, said ring shaped members being positioned concentric to one another about an axis of rotation and substantially coplanar to one another along a plane orthogonal to the axis of rotation;

a third coupling member comprising a substantially ring shaped member, being located in between said first coupling member and said second coupling member;

a spring mechanism comprising parallel spring feet included in said third coupling member, configured to allow said ring shaped members to move relative to one another along said axis or rotation;

said third coupling member having formed thereon a first pair of connecting elements diametrically opposed to one another and defining a first axis, and further having formed thereon a second pair of connecting elements diametrically opposed to one another and defining a second axis that is substantially perpendicular to said first axis;

said first coupling member having formed thereon a third pair of connecting elements configured to conform to said first pair of connecting elements of the third coupling member; and said second coupling member having formed thereon a fourth pair of connecting elements configured to conform to said second pair of connecting elements of the third coupling member.

10. A rotation sensor comprising:

a casting having a coupling contained therein, the coupling comprising:

a first separate coupling member, a second separate coupling member, a third separate coupling member being located in between said first coupling member and said second coupling member, said third coupling member having formed thereon a first pair of connecting elements diametrically opposed to one another and defining a first axis, and further having formed thereon a second pair of connecting elements diametrically opposed to one another and defining a second axis that is substantially perpendicular to said first axis, said first coupling member having formed thereon a third pair of connecting elements configured to conform to said first pair of connecting elements of the third coupling member, and said second coupling member having formed thereon a fourth pair of connecting elements configured to conform to said second pair of connecting elements of the third coupling member;

wherein said first coupling member and said third coupling member rotate around said first axis, and said second coupling member and said third coupling member rotate around the second axis; and a signal output terminal configured to output electrical signals from said casting.

11. A rotation sensor according to claim 10, wherein:

each connecting element of said first pair of connecting elements comprises a recess or a projection with an outer surface having a curve thereon, and said third pair of connecting elements comprises a recess corresponding to each projection of the first pair of connecting elements and a projection with an outer surface having a curve thereon corresponding to each recess of the first pair of connecting elements.

12. A rotation sensor according to claim 11, further comprising a resiliency member placed in said recess of the first or third pair of connecting elements to bias a projection corresponding to the recess toward a center of the coupling.

13. A rotation sensor according to claim 10, wherein:

each connecting element of said second pair of connecting elements comprises a recess or a connecting projection with an outer surface having a curve thereon, and said fourth pair of connecting elements comprises a recess corresponding to each connecting projection of the second pair of connecting elements and a connecting projection with an outer surface having a curve thereon corresponding to each recess of the second pair of connecting elements.

14. A rotation sensor according to claim 10, wherein:

said third coupling member is configured to absorb a shift along an axis that is substantially perpendicular to a plane in which the first coupling member is positioned.

15. A rotation sensor according to claim 10 wherein:

said first second and third coupling members each comprise a substantially ring shaped member; and said ring shaped members are positioned concentric to one another about an axis of rotation and are substantially coplanar to one another along a plane orthogonal to the axis of rotation.

16. A rotation sensor comprising:

a casting having a coupling contained therein, the coupling comprising:

a first separate coupling member, a second separate coupling member, a third separate coupling member being located in between said first coupling member and said second coupling member, said third coupling member having formed thereon a first pair of connecting elements diametrically opposed to one another and defining a first axis, and further having formed thereon a second pair of connecting elements diametrically opposed to one another and defining a second axis that is substantially perpendicular to said first axis, said first coupling member having formed thereon a third pair of connecting elements configured to conform to said first pair of connecting elements of the third coupling member, and said second coupling member having formed thereon a fourth pair of connecting elements configured to conform to said second pair of connecting elements of the third coupling member;

a spring mechanism configured to allow said ring shaped members to move relative to one another along said axis of rotation; and a signal output terminal configured to output electrical signals from said casting.

17. A rotation sensor according to claim 16, wherein said spring mechanism comprises spring plates.

18. A rotation sensor comprising:

a casting having a coupling contained therein, the coupling comprising:

a fast coupling member comprising a substantially ring shaped member, a second coupling member comprising a substantially ring shaped member, said ring shaped members being positioned concentric to one another about an axis of rotation and substantially coplanar to one another along a plane orthogonal to the axis of rotation, a third coupling member comprising a substantially ring shaped member, being located in between said first coupling member and said second coupling member, a spring mechanism comprising parallel spring feet included in said third coupling member, configured to allow said ring shaped members to move relative to one another along said axis or rotation, said third coupling member having formed thereon a first pair of connecting elements diametrically opposed to one another and defining a first axis, and further having formed thereon a second pair of connecting elements diametrically opposed to one another and defining a second axis that is substantially perpendicular to said first axis, said first coupling member having formed thereon a third pair of connecting elements configured to conform to said first pair of connecting elements of the third coupling member, and said second coupling member having formed thereon a fourth pair of connecting elements configured to conform to said second pair of connecting elements of the third coupling member; and a signal output terminal configured to output electrical signals from said casting.

19. A coupling comprising:

a first separate coupling member;

a second separate coupling member;

a third separate coupling member being located in between said first coupling member and said second coupling member;

said third coupling member having formed thereon a first pair of connecting elements diametrically opposed to one another and defining a first axis, and further having formed thereon a second pair of connecting elements diametrically opposed to one another and defining a second axis that is substantially perpendicular to said first axis;

means for slidably joining said first coupling member to said third coupling member along said first axis; and means for slidably joining said second coupling member with said third coupling member along said second axis.

20. A coupling according to claim 19, further comprising means for absorbing a shift along an axis that is substantially perpendicular to a plane in which the first coupling member is positioned.

21. A coupling according to claim 9, wherein;
each connecting element of said first pair of connecting elements comprises a recess or a projection, and
said third pair of connecting elements comprises a recess corresponding to each projection of the first pair of connecting elements and a projection corresponding to each recess of the first pair of connecting elements.

22. A coupling according to claim 9, further comprising a resiliency member placed in said recess of the first or third pair of connecting elements to bias a projection corresponding to the recess toward a center of the coupling.

23. A coupling according to claim 9, wherein:
each connecting element of said second pair of connecting elements comprises a recess or a connecting projection, and
said fourth pair of connecting elements comprises a recess corresponding to each connecting projection of the second pair of connecting elements and a connecting projection corresponding to each recess of the second pair of connecting elements.

24. A coupling according to claim 9, wherein:
said third coupling member is configured to absorb a shift along an axis that is substantially perpendicular to a plane in which the first coupling member is positioned.

25. A rotation sensor according to claim 18, wherein: each connecting element of said first pair of connecting elements comprises a recess or a projection, and
said third pair of connecting elements comprises a recess corresponding to each projection of the first pair of connecting elements and a projection corresponding to each recess of the fast pair of connecting elements.

26. A rotation sensor according to claim 18, further comprising a resiliency member placed in said recess of the first or third pair of connecting elements to bias a projection corresponding to the recess toward a center of the coupling.

27. A rotation sensor according to claim 18, wherein:
each connecting element of said second pair of connecting elements comprises a recess or a connecting projection, and
said fourth pair of connecting elements comprises a recess corresponding to each connecting projection of the second pair of connecting elements and a connecting projection corresponding to each recess of the second pair of connecting elements.

28. A rotation sensor according to claim 18, wherein:
said third coupling member is configured to absorb a shift along an axis that is substantially perpendicular to a plane in which the first coupling member is positioned.

29. A coupling according to claim 6, further comprising a spring mechanism configured to allow said ring shaped members to move relative to one another along said axis of rotation, and wherein said spring mechanism comprises spring plates attached to respective surfaces of said ring shaped members.

30. A coupling comprising:
a first separate coupling member;
a second separate coupling member;
a third separate coupling member being located in between said first coupling member and said second coupling member;
said third coupling member having formed thereon a first pair of connecting elements diametrically opposed to one another and defining a first axis, and further having formed thereon a second pair of connecting elements diametrically opposed to one another and defining a second axis that is substantially perpendicular to said first axis;
said first coupling member having formed thereon a third pair of connecting elements configured to conform to said first pair of connecting elements of the third coupling member; and
said second coupling member having formed thereon a fourth pair of connecting elements configured to conform to said second pair of connecting elements of the third coupling member, wherein at least one of said pairs of connecting elements is joined by an elastic member to the pair of connecting elements to which the at least one pair is configured to conform such that said third coupling member is capable of resiliently moving in an axial direction relative to at least one of said first and second coupling members, said axial direction being substantially perpendicular to said first and second axis.

* * * * *